United States Patent [19]

Niethammer et al.

[11] 4,061,997
[45] Dec. 6, 1977

[54] CIRCUIT ARRANGEMENT FOR THE RECEPTION OF DATA

[75] Inventors: Dieter Niethammer; Werner Paetsch, both of Munich, Germany

[73] Assignee: Siemens Aktiengesellschaft, Munich, Germany

[21] Appl. No.: 632,911

[22] Filed: Nov. 18, 1975

[30] Foreign Application Priority Data

Nov. 20, 1974  Germany ........................ 2455028

[51] Int. Cl.² ............................................. G06F 11/00
[52] U.S. Cl. ........................................... 340/146.1 AX
[58] Field of Search .............. 340/146.1 AX, 146.1 R, 340/146.1 AB; 325/41

[56] References Cited

U.S. PATENT DOCUMENTS

| | | | |
|---|---|---|---|
| 3,036,290 | 5/1962 | Zarouni .................... | 340/146.1 AX |
| 3,159,811 | 12/1964 | James et al. ................ | 340/146.1 AX |
| 3,439,327 | 4/1969 | Sourgens ................... | 340/146.1 AB |
| 3,534,403 | 10/1970 | Matarese ................... | 340/146.1 AX |
| 3,573,727 | 4/1971 | Freeny ..................... | 340/146.1 AX |
| 3,618,015 | 11/1971 | Homonick ................. | 340/146.1 AX |
| 3,829,777 | 8/1974 | Muratani et al. .......... | 340/146.1 AX |
| 3,863,215 | 1/1975 | McGrogan, Jr. ........... | 340/146.1 AX |
| 3,934,224 | 1/1976 | Dulaney .................... | 340/146.1 AX |

Primary Examiner—Charles E. Atkinson
Attorney, Agent, or Firm—Schuyler, Birch, Swindler, McKie & Beckett

[57] ABSTRACT

A circuit arrangement for data transmission systems is described wherein the transmission of excessively faulty data signals is recognized and prevented, thereby stopping the transmission of senseless text. A fault discriminator emits a fault signal which is subsequently integrated. The integrated fault signal, if it exceeds a predetermined value, triggers a threshold value stage to produce a blocking signal. The blocking signal acts on the circuitry in a data sink, e.g., a teleprinter, to suppress the processing of the received data.

6 Claims, 5 Drawing Figures

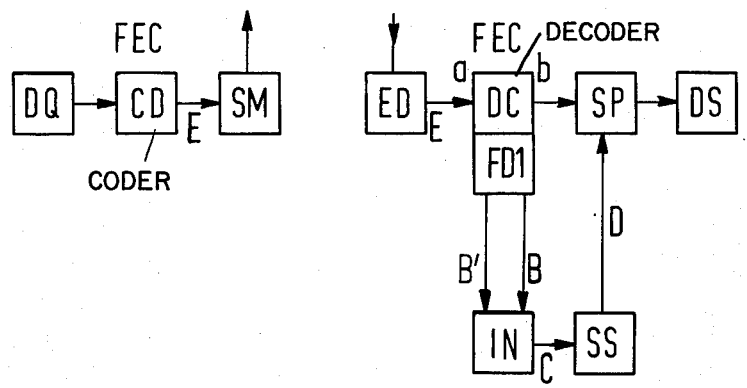
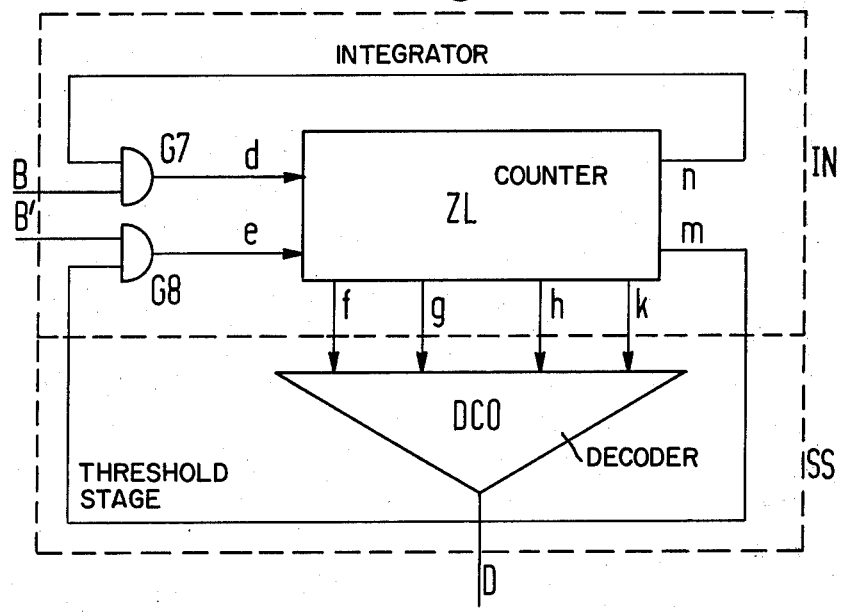

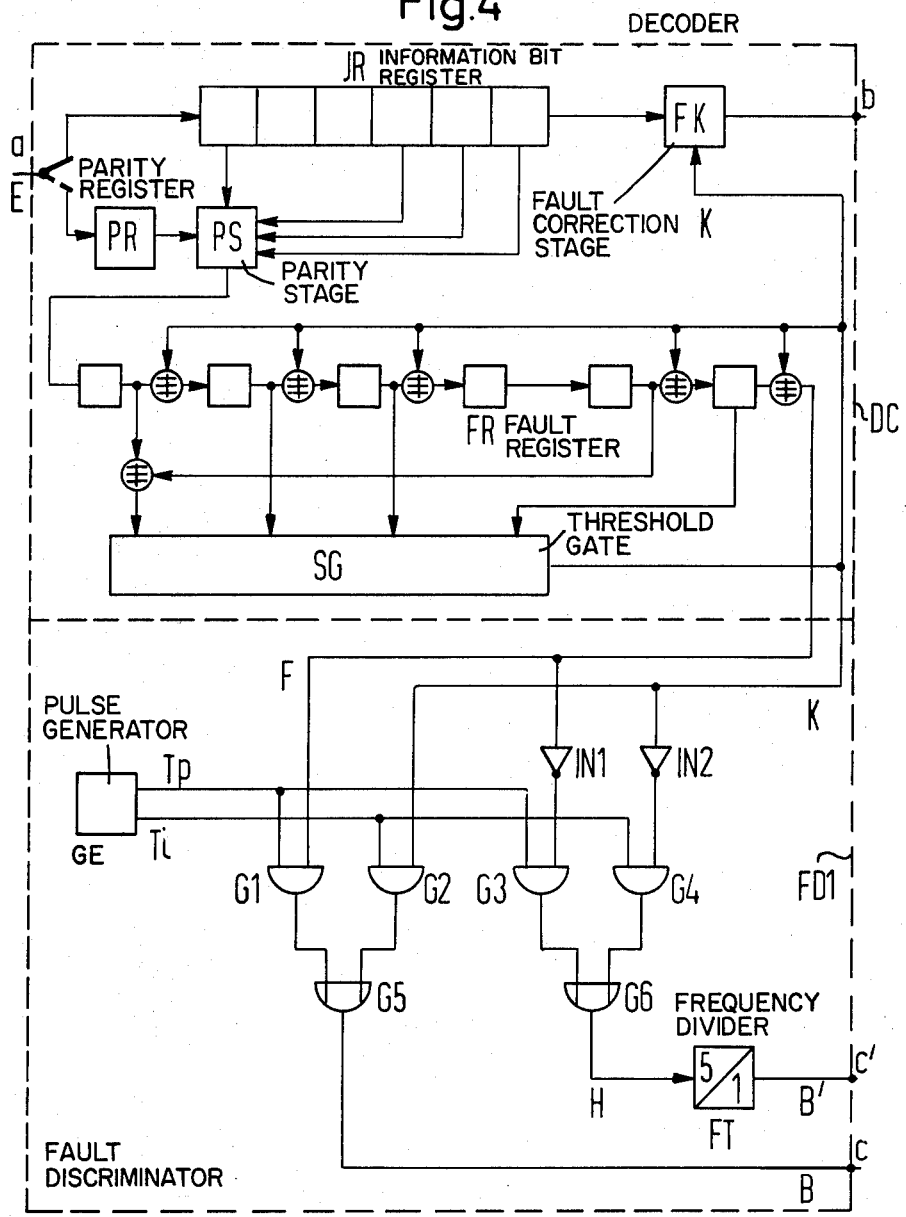

CIRCUIT ARRANGEMENT FOR THE RECEPTION OF DATA

BACKGROUND OF THE INVENTION

This invention relates to a circuit arrangement for the reception of data which are conducted via a data receiver to a data sink, wherein, using a fault discriminator, a fault signal is emitted which indicates faults in the transmitted items of data.

In the automatic reception of data, when the fault rate reaches a given value, transmission interferences can result in the output of a senseless text. Even when the transmitter is switched off and no more data is being received, generally arbitrary random combinations continue to be emitted as text. If, for example, a teleprinter is provided as data sink, it can occur that in the event of greatly adulterated data, or in the absence of any data, this teleprinter will for hours emit paper printed with senseless text.

An object of the invention is to provide a circuit arrangement of the type described hereinabove, in which the output of a senseless text of the kind described is prevented.

A further object is to provide such a circuit arrangement which can be used when a data transmission system is being operated with forward correction devices.

SUMMARY OF THE INVENTION

In accordance with the invention, an integration stage is provided which is supplied with a fault signal and which emits an integrated fault signal. The integrated fault signal is conducted to a threshold value stage which emits a blocking signal when the integrated fault signal exceeds a given threshold value, and the blocking signal is conducted to a blocking stage which suppresses the processing of the data in the data sink.

The described circuit arrangement in accordance with the invention is characterized in that in automatic data transmission, both in the case of a heavily disturbed transmission link and in the absence of data, no meaningless text is emitted at the receiving end.

The integration stage can, for example, be in the form of an analog of digital operating device. As digital operating devices are commercially available at reasonable prices, it is advantageous for the integration stage to be in the form of a counter which operates in digital fashion, and counts forwards and backwards. The counter is supplied with the fault signal whose count is reduced or increased within a given counting range and which emits the integrated fault signal in digital form.

If a counter is used which via a plurality of outputs emits binary signals which together represent the count and the integrated fault signal in binary form, it is advantageous to connect these outputs to a decoder which emits the blocking signal, whenever a given count is reached or overshot. If a counter is used which emits a signal via one single line whenever a specific count is reached or is exceeded, then this signal can itself be used as blocking signal.

If the data sink is a teleprinter, the blocking stage should emit a continuous stop polarity to the teleprinter on the reception of the blocking signal. The further emission of meaningless text is thus safely avoided.

In data transmission systems provided with forward correction devices, frequently, using a fault register (syndrome register) and a threshold value gate at the receiving end and a correction signal is obtained when it is signalled, at least in a given number of the cells of the fault register, that a fault has occurred. It has proved advantageous to produce the fault signal, not only with the aid of this correction signal, but also whenever a fault is indicated in a cell of the fault register.

BRIEF DESCRIPTION OF THE DRAWINGS

In the following exemplary embodiments of the invention will be described making reference to FIGS. 1 to 5, wherein identical components appearing in more than one figure have been provided with like references.

FIG. 3 is a block-schematic diagram of a data transmission system like that illustrated in FIG. 1, but having a forward correction device.

FIG. 4 is a more detailed schematic illustration of a decoder which is used at the input of the system illustrated in FIG. 3.

FIG. 5 is a schematic diagram of the integration stage used in the FIGS. 1 and 3 embodiments.

DETAILED DESCRIPTION OF THE PREFERRED EMBODIMENTS

Figure 1:
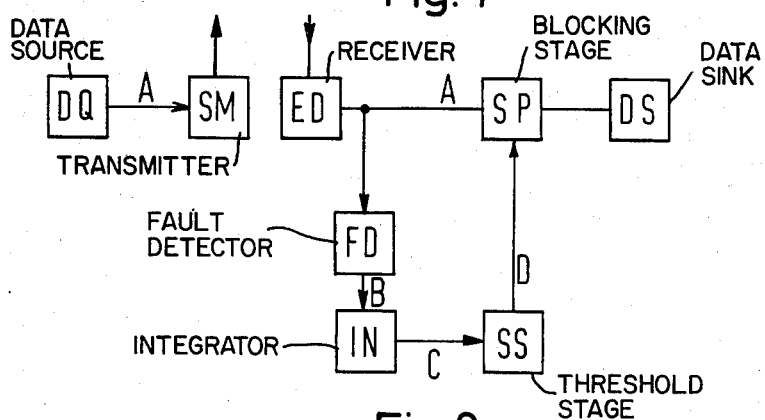
FIG. 1 is a block-schematic diagram of a data transmission system for the automatic reception of data transmitted in block form and constructed according to the principles of the invention.

The data transmission system illustrated in FIG. 1 comprises a data source DQ, a transmitter SM which contains a modulator, a receiver ED which contains a demodulator, a blocking stage SP, a data sink DS, a fault detector FD, an integration stage IN and a threshold value stage SS. The data source DQ can, for example, be a teleprinter which supplies the data referenced A to the transmitter SM. Using the modulator and the transmitter SM a frequency-conversion can then be effected before the data are transmitted to the receiving end. Either a cable transmission link or a wireless transmission link, as illustrated, can be provided. These transmission devices are assumed to be known per se and will not be described in detail since they are not a part of the present invention.

Figure 2:
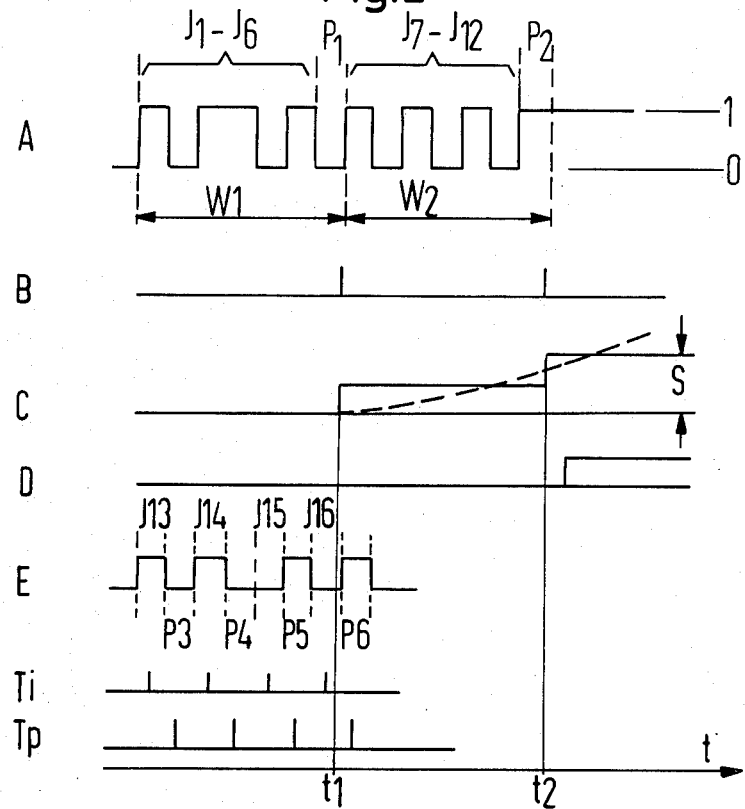
FIG. 2 is a time-waveform diagram illustrating signals which occur in the FIG. 1 data transmission system.

FIG. 2 shows a few signals of the FIG. 1 data transmission system. The signal A is a binary signal whose binary values are referenced 1 and 0 and which represents the items of data which are to be transmitted. It will be assumed that the signal A is classified into blocks in such manner that consecutive code words W1, W2 each comprise six information bits $J1 - J6$, $J7 - J12$ and one parity bit P1, P2. Thus, in the present case the code word W1 comprises the information bits 101101 and the parity bit 0. This signal A is transmitted using the transmitter SM and the receiver ED so that at the output of the receiver ED a signal is again available which is substantially similar to the signal A. As each code word W1 and W2 includes seven bits, there are 128 possible different code words of which only 34 are used. These 34 code words are assigned either an alphanumerical character or a control signal. Generally, it may be assumed that the data source DQ emits each of the 34 correct code words consecutively.

In the event of undisturbed reception, correct code words are also received from the output of the receiver ED. In disturbed reception, however, it frequently occurs that an incorrect code word is emitted from the output of the receiver ED, i.e., a code word which is assigned neither an alphanumerical character nor a control signal. In the fault detector FD it is established whether this is a correct or an incorrect code word by using, for example, parity bits PB. Fault signal B emitted from fault discriminator FD signals the reception of a correct or an incorrect code word. In the present case it has been assumed that both code words W1 and W2 are incorrect code words, and therefore, pulses of the fault signal B occur at the times $t1$ and $t2$.

The fault signal B is conducted to integration stage IN which emits an integrated fault signal C. In an analog integration stage IN the integrated signal C illustrated in broken lines is to be expected, and in a digital integration stage IN the solid-line integrated fault signal C must be expected.

The integrated fault signal C is conducted to threshold value stage SS, which emits a blocking signal D when a given threshold value S is reached. Generally, a larger number of individual pulses of the fault signal B are required to reach the threshold value S. To simplify the illustration, the threshold value S was in fact reached with two pulses of the fault signal B. Shortly after the time $t2$, the blocking signal D is thus emitted to the blocking stage SP which prevents the further transmission of the signal A to the data sink DS. The data sink DS can, for example, be a teleprinter.

On the occurrence of the blocking signal D, instead of the signal A, it is then possible to emit to data sink DS a signal corresponding to the continuous stop polarity, as a result of which the teleprinter does not printout any further text. Instead of the signal A, it is also possible to supply the combinations 29 or 32 of CCITT Code No. 2 to the teleprinter, since these combinations 29 and 32 also do not result in any print-out of characters.

FIG. 3 shows a data transmission system constructed according to the invention and having forward correction devices. In addition to the devices shown in FIG. 1, a coder CD is shown at the transmitting end, and a decoder DC is present at the receiving end.

The data source DQ can emit a signal which consists only of information bits. The coder CD then emits signal E, as shown in FIG. 2, and which contains information bits J13, J14, J15, J16 and parity bits P3, P4, P5, P6. The parity bits are generally dependent upon a considerably larger number of information bits than are shown in FIG. 2.

At the receiving end, the received and demodulated signal is conducted to decoder DC which effects a separation of the information bits and the parity bits and which contains a fault correction stage, by means of which faults are corrected.

FIG. 4 is a more detailed illustration of the decoder DC schematically illustrated in FIG. 3 and the fault discriminator FD1. Via input $a$ is supplied the signal from receiver ED which in undisturbed transmission is identical to the signal E. Using the code frame switch, during the switching position shown in solid lines, the information bits J13, J14, J15, J16 are input into the information register JR, and during the switching position shown in broken lines, the parity bits P3, P4, P5, P6 are input into the parity register PR.

The parity stage PS emits a 0-signal or a 1-signal whenever the sum of the 1-values present at its inputs is even or odd, respectively. The coder CD in FIG. 3 and the decoder DC are matched to one another in such manner that in the case of fault-free transmission the parity stage PS constantly emits 0-signal, whereas any occurring faults are signalled in each case by a 1-signal and input in serial fashion into the fault register FR. This fault register is also referred to as a syndrome register in the art.

The fault register FR is connected in parallel with threshold value gate SG which, in this exemplary embodiment, emits the signal $K=1$ whenever a 1-signal is present at more than two inputs of the threshold value gate SG. The threshold value gate SG emits the signal $K=0$ whenever a 1-signal is present at no input, only at one input or only at two inputs of the threshold value gate SG.

The signal K is conducted as a correction signal to the fault correction stage FK which in the presence of the signal $K=1$ effects a fault correction of the data emitted from the information bit register JR, so that a corrected signal is emitted via the output $b$. Almost all the outputs of the cells of the fault register FR are connected to NON-EQUIVALENCE gates. Therefore, using these NON-EQUIVALENCE gates, with the signal $K=1$, the storage contents of the cells of the fault register FR are inverted before being transferred into the next call.

The fault discriminator FDI shown in FIG. 4 is an exemplary embodiment of the fault discriminator FDI shown in FIG. 3 and comprises a pulse generator GE, AND gates G1, G2, G3, G4, inverters IN1, IN2, OR gates G5, G6, and frequency divider FT. When a fault is signalled with the correction signal $K=1$, a pulse of the fault signal B is also always produced via the gates G2 and G5. As long as all the faults can be corrected with the fault correction stage FK, and thus the code is not overcharged, the signal $K=1$ indicates that one of the information bits was incorrect. Thus, this signal $K=1$ influences the signal B although a corrected, fault-free signal is emitted via the output $b$.

The signal F is obtained from the last NON-EQUIVALENCE gate. As long as the code is not overcharged, and a fault-free signal is emitted via the output $b$, the signal $F=1$ indicates that a parity bit was incorrect. With the signal $F=1$ a pulse of the fault signal B is likewise produced via the gates G1 and G5. The signal Ti and Tp are shown in the lower part of FIG. 2; these serve as timing signals and are produced by generator GE.

Using the two inverters IN1 and IN2 and the gates G3, G4, G6, the signal H is produced. This signal is complementary to the signal B and can be referred to as a complementary fault signal. Thus, the fault-free data are signalled with the pulses of the complementary fault signal H. If, for example, fault-free data are signalled with the signal $K=0$ then a 1-signal is emitted via the inverter IN2 across the gates G4 and G6, and thus, a pulse of the complementary fault signal H is produced. Similarly, a pulse of the complementary fault signal H is also produced with the signal $F=0$.

Even in the case of a disturbed item of data with fault information bits and parity bits, a relatively large number of pulses of the signal H in comparison to the pulses of the signal B occur within a longer duration of time. In order to decimalize the pulses of the signal H in comparison to the pulses of the signal B the frequency divider FT is provided with a division ratio of 5:1. This division ratio corresponds to the ratio of disturbed information bits to undisturbed information bits, where the correcting capacity of the employed code is just sufficient to correct all the faults and to emit a fault-free signal via the output $b$. In many cases it can be advantageous, in dependence upon the number of faults and in dependence upon the code employed, to use other frequency dividers with different division ratios, in order to take into account transmission conditions which are disturbed to varying degrees. Basically, it would also be conceivable, instead of the frequency divider FT, to use a frequency multiplier which is connected between the output of the gate G5 and the output c, in order to again improve the pulse ratio in favor of the pulses of the signal B.

FIG. 5 is an exemplary embodiment of the integrator IN used with the FIG. 3 embodiment, and comprising counter ZL, decoder DCO and gates G7, G8. The pulses of signal B indicate that faulty data have been transmitted and are conducted via the input d to the counter ZL whose count is thus increased. In constrast, the pulses of the signal B' indicate that the data have been transmitted in the correct manner, and, via the input e, the count of the counter ZL is reduced. The relevant count is signalled via the outputs f, g, h, k, in the form of a binary number.

Using the decoder DCO, blocking signal D is emitted whenever the count emitted via the outputs f, g, h, k is equal to or greater than the number set in the decoder DCO. Thus, with the decoder DCO a threshold value is set, on the reaching or the overshooting of which the blocking signal D is emitted. In the present exemplary embodiment, the threshold value 16 is set up with the decoder DCO. When pulses of the fault signal B are conducted through the input d, the counter ZL counts upwards and when it reaches or overshoots the count 16, the blocking signal D is emitted. This upwards counting continues until a 0-signal is emitted via the output n, which indicates the highest count and blocks the gate G7 so that no further pulses of the signal B can be conducted through the input d.

Individual pulses of the signal B' are conducted through input e to produce a downwards counting. Generally in the case of not too greatly disturbed reception, after a few signals K=1 and possibly also F=1, a few signals K=0 and possibly also F=0 will again occur, and thus, after a few pulses of the signal B, a few pulses of the signal B' are again conducted to the counter ZL, the counter will thus consecutively count upwards and downwards, without reaching the threshold value set in the decoder DCO and without the blocking signal D being emitted. If, however, the counter ZL reaches a lowest count, then via the output m it emits a 0-signal which blocks the gate G8, so that no further pulses of the signal B' are conducted across the input e, and the downwards counting is stopped.

If a teleprinter is provided as data sink DS, then, employing the blocking stage SP, instead of the data emanating from the decoder DC, a signal corresponding to the continuous stop polarity can be supplied so that the teleprinter stops printing out.

The preferred embodiments described hereinabove are intended only to be exemplary of the principles of the invention. It is contemplated that the described embodiments, and their operating parameters, can be modified or changed in a number of ways known to those skilled in the art, while remaining within the scope of the invention, as defined by the appended claims.

We claim:

1. A circuit arrangement for preventing reception of faulty data transmitted from a data source to a data sink in a data transmission system having a fault discriminator which emits a fault signal when there is a fault in the data signal, comprising:
   integrating means for receiving said fault signal and producing therefrom an integrated fault signal,
   threshold signal means for producing a blocking signal when said integrated fault signal reaches or exceeds a predetermined value, and
   blocking means responsive to said blocking signal for blocking the processing of said data in said data sink.

2. The circuit arrangement defined in claim 1 wherein said integrating means comprises a bidirectional digital counter operable to count a given value in accordance with the value of said fault signal and including means for producing said integrated fault signal in parallel binary form from a plurality of outputs.

3. The circuit arrangement defined in claim 2 wherein said threshold signal means comprises a decoder having inputs connected to said binary outputs of said digital counter.

4. The circuit arrangement defined in claim 1 wherein said data comprising information bits and parity bits are transmitted to a data receiver and further comprising:
   fault decoder means comprising an information bit register for receiving and storing said information bits, a parity bit register for receiving and storing said parity bits and means responsive to the contents of said registers for producing said fault signal.

5. The circuit arrangement defined in claim 4 wherein said fault signal comprises first signals indicative of a fault and second signals indicating correct data which are complementary to said first signals and further comprising:
   pulse sequence altering means connected between said fault discriminator and said integrating means for increasing the frequency of said first fault signal and decreasing the frequency of said second fault signal.

6. The circuit arrangement defined in claim 1 wherein said data sink is a teleprinter including means for emitting a continuous stop polarity responsive to said blocking signal.

* * * * *